US012590424B2

(12) United States Patent
Drumm et al.

(10) Patent No.: US 12,590,424 B2
(45) Date of Patent: Mar. 31, 2026

(54) SELF-PROPELLED EARTH WORKING MACHINE HAVING A CANOPY VARIABLE IN LENGTH IN THE LONGITUDINAL DIRECTION OF THE MACHINE

(71) Applicant: Wirtgen GmbH, Windhagen (DE)

(72) Inventors: Stephan Drumm, Vettelschoß (DE); Roland Lull, Königswinter (DE)

(73) Assignee: Wirtgen GmbH, Windhagen (DE)

( * ) Notice: Subject to any disclaimer, the term of this patent is extended or adjusted under 35 U.S.C. 154(b) by 380 days.

(21) Appl. No.: 18/296,411

(22) Filed: Apr. 6, 2023

(65) Prior Publication Data

US 2023/0340737 A1 Oct. 26, 2023

(30) Foreign Application Priority Data

Apr. 22, 2022 (DE) ..................... 10 2022 109 729.3

(51) Int. Cl.
E01C 23/088 (2006.01)
B60J 7/06 (2006.01)
E01C 23/12 (2006.01)

(52) U.S. Cl.
CPC ............ *E01C 23/088* (2013.01); *B60J 7/067* (2013.01); *B60J 7/068* (2013.01); *E01C 23/127* (2013.01);
(Continued)

(58) Field of Classification Search
CPC ... B60J 7/061; B60J 7/062; B60J 7/064; B60J 7/065; B60J 7/067; B60J 7/068
(Continued)

(56) References Cited

U.S. PATENT DOCUMENTS 8,827,374 B2 9/2014 Huhn
10,618,392 B2 4/2020 Buschmann
(Continued)

FOREIGN PATENT DOCUMENTS

CN 103950367 A 7/2014
CN 220199440 U 12/2023
(Continued)

OTHER PUBLICATIONS

European Search Report for corresponding patent application No. 23164975.7, dated Aug. 21, 2023, 8 pages (not prior art).
(Continued)

*Primary Examiner* — Sunil Singh
(74) *Attorney, Agent, or Firm* — Lucian Wayne Beavers; Patterson Intellectual Property Law, PC

(57) ABSTRACT

The present invention relates to a self-propelled earth working machine (10) for removing material and/or changing a density of ground material and/or changing a ground surface (AO) and/or applying material onto a ground area (U), the earth working machine (10) comprising:
   a machine frame (12),
   a traveling gear (22) supporting the machine frame (12),
   a working apparatus (32) for earth working,
   a power source (39) for supplying power to at least one functional module, comprising the working apparatus (32) and a travel drive, the earth working machine (10) comprising an operator's platform (24) having a canopy (44) having a variable canopy area (54).
The invention provides for the canopy area (54) to be variable in the longitudinal machine direction (L).

15 Claims, 7 Drawing Sheets

(52) U.S. Cl.
CPC ...... *E01C 2301/30* (2013.01); *E01C 2301/40*
(2013.01)

(58) Field of Classification Search
USPC ........................................................ 296/219
See application file for complete search history.

(56) References Cited

U.S. PATENT DOCUMENTS

| | | | |
|---|---|---|---|
| 10,822,041 B2 | 11/2020 | Barimani et al. | |
| 2009/0192682 A1 | 7/2009 | Ciarla et al. | |
| 2011/0254314 A1 | 10/2011 | Renard | |
| 2020/0269662 A1* | 8/2020 | Binstock ............ | B62D 33/0617 |
| 2023/0340737 A1 | 10/2023 | Drumm et al. | |

FOREIGN PATENT DOCUMENTS

| | | | |
|---|---|---|---|
| DE | 2433057 A1 | 1/1976 | |
| DE | 102008047583 A1 | 4/2010 | |
| DE | 102010024687 A1 | 12/2011 | |
| DE | 202013006878 U1 | 10/2013 | |
| DE | 102020130653 A1 | 5/2022 | |
| EP | 810324 A1 | 12/1997 | |
| EP | 2450209 A2 * | 5/2012 | ........... B60J 1/2025 |
| EP | 2786884 A2 | 10/2014 | |
| EP | 3412830 A1 | 12/2018 | |
| EP | 3489416 A1 | 5/2019 | |
| JP | 08197957 A | 8/1996 | |
| JP | 2003267057 A | 9/2003 | |
| JP | 2005335482 A | 12/2005 | |
| JP | 6877744 B2 | 5/2021 | |
| KR | 1020120129220 A | 11/2012 | |
| WO | WO-2017160841 A1 * | 9/2017 | ............. B60J 7/067 |

OTHER PUBLICATIONS

Office Action for corresponding patent application No. DE 10 2022 109 729.3 dated Feb. 27, 2023, 6 pages (not prior art).

angi.com/articles/pros-and-cons-retractable-deck-awnings.htm; "Learn the Pros and Cons of Retractable Patio Awnings" (1 page) (Dated Apr. 5, 2023—admitted to be prior art).

China Office Action for corresponding patent application No. 2025052201698230, dated May 22, 2025, 9 pages (not prior art).

* cited by examiner

SELF-PROPELLED EARTH WORKING MACHINE HAVING A CANOPY VARIABLE IN LENGTH IN THE LONGITUDINAL DIRECTION OF THE MACHINE

RELATED APPLICATIONS

This application claims priority to German Patent Application Ser. No. 10 2022 109 729.3 filed Apr. 22, 2022, which is incorporated herein by reference.

BACKGROUND OF THE DISCLOSURE

Field of the Disclosure

The present invention relates to a self-propelled earth working machine for removing material and/or changing a density of ground material and/or changing a ground surface and/or applying material onto a ground area, the earth working machine comprising:

a machine frame,
a traveling gear supporting the machine frame,
a working apparatus for earth working,
a power source for supplying power to at least one functional module, preferably comprising at least the working apparatus and/or a travel drive, the earth working machine comprising an operator's platform having a canopy having a variable canopy area.

DESCRIPTION OF THE PRIOR ART

For removal work, a self-propelled earth working machine of this kind may be a road milling machine, a surface miner or a recycler, the recycler also applying material initially removed from the ground onto a ground area. For pure application work, the self-propelled earth working machine may be a road finisher such as an asphalting machine or a slipform paver, for example. These are only some examples, further earth working machines, such as self-propelled soil compactors for example, being conceivable and known.

A self-propelled earth working machine of the type mentioned at the outset is known from EP 3 489 416 A1 (U.S. Pat. No. 10,822,041). The known earth working machine exhibits an operator's platform laterally enlargeable in the transverse direction of the machine by pullouts. In order for the operator's platform enlarged by the pullouts to be also covered by the canopy of the operator's platform, the canopy of the known earth working machine respectively has a displaceable shell section on each side of the canopy in the transverse machine direction, by the displacement of which the canopy area may be enlarged in the transverse machine direction and minimized again to the original canopy area.

The canopy of the known earth working machine is also displaceable in the vertical machine direction in order to keep the projected area as small as possible when projecting in the longitudinal machine direction for transport. Keeping the projected area as small as possible is also the reason why the operator's platform is expandable by pullouts in the transverse machine direction and is not designed to be permanently of greater width. Due to the dimensions achieved in this manner, the earth working machine can be transported in accordance with the applicable legal framework without special permit.

Another earth working machine having a height-adjustable canopy position is known from DE 10 2008 047 583 A1. There the canopy is formed by a hard shell without moving parts, but with a constant canopy area. In contrast to the canopy of EP 3 489 416 A1 (U.S. Pat. No. 10,822,041), which is displaceable in linear translatory fashion in the vertical machine direction, the canopy of the earth working machine known from DE 10 2008 047 583 A1 is displaceable in translatory fashion along a curved path by means of a parallelogram-linkage of a front windshield and a rear window, so that the lowered canopy is situated, not above the operator's platform, but above areas of the machine body in front of or behind the operator's platform. The canopy shell is displaceable on the parallelogram-linkage in the transverse machine direction.

EP 3 412 830 A1 (U.S. Pat. No. 10,618,392) discloses an earth working machine in the form of a road finisher, the canopy area of which is likewise constant, the canopy of which, however, supports a roller blind or a sectional system, by which an access opening facing the rear of the road finisher can be shut from the canopy.

The lowered position of the canopy described above is normally used for transporting the machine. When the canopy is lowered, the machines are not operable or operable only to a limited extent. An exception in this regard is the road milling machine known from DE 20 2013 006 878 U1 (U.S. Pat. No. 8,827,374), the canopy of which with a constant canopy area is likewise displaceable in translatory fashion via a linkage along a curved path between a raised and a lowered position. In the lowered position, the canopy rests on the machine body section in front of the operator's platform. Since the linkage is hinged on the machine body exclusively in front of the operator's platform, the operator's platform is usable without restrictions when the canopy is in the lowered position. However, the operator of this road milling machine is also only able to choose between a fully raised and a fully lowered canopy. Intermediate positions are not possible due to the curved movement path of the canopy, since the canopy would otherwise be situated in the visual range in front of the machine operator.

SUMMARY OF THE DISCLOSURE

The most basic object of the present invention is to allow the machine operator to arrange his workspace, that is, the operator's platform, as individually as possible while performing earth work.

The present application achieves this object in a self-propelled earth working machine of the type mentioned at the outset in that the size of the canopy area is variable in the longitudinal machine direction. Since, depending on the structural design of the earth working machine, a machine body extending over the entire width of the operator's platform is located at least on one side of the operator's platform in the longitudinal machine direction, often on both sides of the operator's platform in the longitudinal machine direction, while the operator's platform is bounded laterally, that is, in the transverse machine direction, often only by a railing, a canopy having a canopy length variable in the longitudinal machine direction may be securely situated on the machine frame, if desired by interposition of further components of the machine body. Due to the fact that the length of a canopy area situated or able to be situated above an operator's platform is variable in the longitudinal machine direction, the machine operator is able to choose without any impediment to his work on the operator's platform whether to work quasi with or without a canopy. Thus, he is able to protect himself on the one hand against weather conditions and excessive exposure to sunlight, and yet with decreasing daylight is able to improve visual conditions on his operator's platform by reducing the canopy area.

For varying the canopy area in the longitudinal machine direction, the earth working machine has a canopy structure variable in length in the longitudinal machine direction or a canopy component variable in length in the longitudinal machine direction. The canopy structure and hence the canopy area are preferably variable in the longitudinal machine direction over at least 90% of the width to be measured in the transverse machine direction, preferably over the entire width of the canopy structure or of the canopy component, in particular of the canopy area.

The canopy structure or the canopy component as a whole may be accommodated so as to be displaceable in the transverse machine direction. The canopy area is preferably not variable in size in the transverse machine direction. The canopy component variable in length in the longitudinal machine direction, in particular the lead component to be explained in more detail below, may also include a movement component in the vertical machine direction when it is varied in length or moved in the longitudinal machine direction. This makes it possible for example to form a canopy area that is inclined about an axis of inclination running in the transverse machine direction. Thus, a machine operator can be shielded against exposure to sunlight even when the sun is lower. For every movement segment of a change of the canopy area, the movement component in the longitudinal machine direction is preferably greater than the concurrent movement component in the vertical machine direction.

In principle, the canopy with the canopy area variable in the longitudinal machine direction may be variable only between two positions of different canopy areas, for example a position having a minimal canopy area and a position having a maximal canopy area. Preferably, the canopy may be adjustable in a plurality of respectively stable intermediate positions, each intermediate position having a different canopy area dimension. The intermediate positions may be assumed by a stepped variability of the canopy area in the longitudinal machine direction or preferably by a stepless variability of the canopy area. The variability of the canopy area in this connection means the variability in the length of the canopy structure or of the canopy component in the longitudinal machine direction.

To prevent a canopy area material forming the canopy area from taking up an undesirably large storage space when the canopy area is greatly reduced or minimized, the canopy may have a base section and an extension section. The extension section is then preferably extendable and retractable relative to the base section in the longitudinal machine direction. The canopy area is thus variable as a function of the length of extension, along which the extension section is extended from the base section.

In terms of construction, the extendability of the extension section relative to the base section may be realized in various ways. For forming at least one portion of the canopy area, preferably a major portion of the canopy area, the extension section may comprise, for example, a windable canopy area material. When adjusting the canopy area to a minimum size, it is then possible to accommodate the canopy area material as a roll in the base section with little storage space requirement and to unwind it from the roll by pulling the canopy area material out in the longitudinal direction of the machine in order to enlarge the roof area.

Additionally or alternatively, the canopy area material may be foldable, so that the canopy section variable in length in the longitudinal machine direction may be designed as an accordion-type cover.

The windable and/or foldable canopy area material may be a flexible canopy area material, for example a fiber material or sheeting, in particular plastic sheeting. As fiber-reinforced plastic sheeting, the canopy area material may also be a combination of fiber material and sheeting. The fiber material may be a woven fabric or knitted fabric, for better protection against weather conditions in particular a waterproofed woven fabric or knitted fabric. Moreover, if the fiber material is situated as reinforcement in plastic sheeting, it may be in the form of a tangle of fibers or fiber roving.

A further possibility, applicable additionally or alternatively, of designing a canopy of the operator's platform to be variable in length is the use of shell components as canopy area material, which are displaceable relative to one another in the longitudinal machine direction in changing their degree of overlap. The shell components may be flat or curved for increasing their stability, preferably curved about an axis of curvature running in the longitudinal machine direction and thus in the relative movement direction of the shell components, or they may be profiled about a profile axis running in the longitudinal machine direction, as is known from telescopic covers of movement guides of machine tools. The shell components may be arranged overlapping in scale-like fashion, adjacent scale components being respectively movable in pairs relative to each other in the longitudinal machine direction. As profiled components, the shell components may be movable in telescopic fashion relative to each other in the longitudinal machine direction.

By using the aforementioned shell components, it is possible to obtain a canopy that is more stable or resistant against objects falling on it than the previously mentioned flexible material webs made of fiber material and/or sheeting.

The term "flexible" above denotes a roof area material, which exists as a thin material web, which is non-rigid in the extended state and which, in the extended state without a supporting structure, deforms under its own weight. In the case of an accordion-type cover as a structure forming the canopy area of variable length, a stiffening of the canopy area material is achieved by the pleats, which a non-folded canopy area material of the same material composition does not possess.

To facilitate extension of the extension section away from the base section, according to an advantageous development of the present invention, the extension section may have a lead component distinct from the roof area formed by the roof area material. The lead component can be moved away from the base section and moved toward the base section in the longitudinal machine direction. In order to form a defined canopy area, the canopy area material is preferably situated between the lead component and the base section. When using a windable or foldable canopy area material, the lead component may have a greater component stiffness, in particular bending resistance about a bending axis running in the longitudinal machine direction. In contrast to the windable or foldable canopy area material, the lead component is preferably inherently rigid, i.e., it maintains its given shape under the load of its own weight.

The lead component may comprise or be a bar, which extends preferably over at least 90% of the width of the canopy area material measured in the machine transverse machine direction, particularly preferably over the entire width of the canopy area material, particularly preferably even beyond it on both sides. The lead component may be cost-effectively developed as an extrusion profile, it being possible for the lead component to be formed either from metal or from plastic.

The lead component may be designed for an application of force for pulling out the extension section. For this purpose, the canopy area material may have a lead section, which is fixed on the lead component for joint movement and which precedes the further canopy area material when the extension section is pulled out in order to enlarge the canopy area. Due to the described fixation, a movement of the lead component in the longitudinal machine direction away from the base section then also entails a movement of canopy area material away from the base section.

The lead component is preferably connected to the base section of the canopy by a guide structure in order to guide the relative movement of the lead component away from the base section and toward the base section. The guide structure may comprise at least one articulated arm, a scissor gear or telescopic guide rods.

In order to ensure that the canopy area material is able to span the operator's platform at least in sections in the longitudinal machine direction in spite of the movability of the canopy area material relative to the base section, the base section preferably comprises a base component on which a fixation section of the canopy area material is fixed. In this way, the lead section and the fixation section may be formed by different shell components, between which further shell components are situated that are movable relative to one another in the longitudinal machine direction, the dimension and relative movement path of which in the longitudinal machine direction substantially determines the extension length of the canopy area relative to the base section.

Alternatively or additionally, the lead section may be a first end section of a windable and/or foldable canopy area material and the fixation section may be a second end section opposite the first end section at a distance in the winding direction or extension direction, the distance between the lead section and the fixation section along the material surface lying in between being a measure of the possible extension length of the extension section.

The base section, in particular the base component or a part of the same connected to the lead component, may be rotatable about the aforementioned axis of inclination running in the transverse machine direction in order to facilitate setting a canopy inclination within an available adjustment range.

Like the lead component, the base component may be an inherently rigid component, for example a bar, a pipe, or a rod, on which the fixation section of the accordion-type cover or the shell component forming the fixation section is fastened, for example by clamping, gluing, riveting, screwing and/or form-locking rear engagement, to mention only some fixation options. In the case of a development of the fixation section by a windable canopy area material, the base component preferably comprises a winding roll core rotatable about a winding axis, on which the fixation section of the windable canopy area material is fixed in at least one of the aforementioned fixation options. The winding roll core may also comprise or be a pipe or a rod for example, preferably a cylindrical pipe or a cylindrical rod for providing pull-out forces that are as uniform as possible throughout a pull-out process.

The base section, and in particular the base component, extends preferably by more than the width of the canopy area material in the transverse machine direction so that the base section is able to receive and release the canopy area material in the longitudinal machine direction without folding it.

The winding roll core is preferably pretensioned by pretensioning means in a direction of rotation about a winding axis virtually passing centrally through the winding roll core, preferably running in the transverse machine direction, so that the windable canopy area material is automatically wound up onto the winding roll core due to the pretensioning of the winding roll core and is wound off the canopy area material roll counter to the pretensioning of the winding roll core. This achieves the result that the canopy area formed by the windable canopy area material is always taut in the area between the lead component and the base component and does not disturb the machine operator by its intrinsic non-rigidity.

To protect the canopy area material, in particular in the retracted state having only a small or no canopy area, that is, when there is only a little distance between the lead component and the base component in the longitudinal machine direction, the base section in an advantageous development may comprise a housing shell, which at least partially surrounds the extension section in its retracted state. Preferably, the housing shell surrounds the extension section in the circumferential direction entirely except for an extension slit penetrated by the canopy area material. When the extension section is fully retracted, the lead component preferably closes the extension slit.

The housing shell of the base section may be the, possibly multi-part, base component, on which an accordion-type cover or a shell component is fixed. Alternatively or additionally, the winding roll core may be mounted in the housing shell so as to rotate about the winding axis.

In order to stabilize the canopy of variable length, a support mechanism may be situated on the machine body and/or on the extension section, in particular on the lead component, as a support mechanism carrier, by which the extension section, in particular the lead component, is supportable on the body of the machine. So that the support mechanism does not disturb during the movement of canopy area material in the longitudinal machine direction or does not collide with persons or objects, the support mechanism may be movable relative to the support mechanism carrier between an inactive position and an active position. In the inactive position, the support mechanism runs preferably parallel to the canopy area, in particular parallel to the lead component. In the active position, at its distant end away from the support mechanism carrier, the support mechanism is supported on the machine body. The machine body comprises the machine frame and structural components situated on the machine frame, possibly movable relative to the latter.

The support mechanism may therefore have at least one collapsable and/or extendable, in particular telescopic, support. The support mechanism preferably has at least two supports situated at a distance from one another in the transverse machine direction, which are movable, in particular collapsable and/or extendable, in particular telescopic, relative to the support mechanism carrier, in order to be able to prevent a tilting inclination of the extension section about a tilting axis running the longitudinal machine direction.

An advantage of situating the support mechanism on the lead component as the carrier is that the canopy may be supported on the machine body independently of its respectively selected canopy area, that is, independently of the extension length of the extension section.

The earth working machine may, in particular as part of the operator's platform, comprise a protective shield running in the transverse machine direction, in order to shield the machine operator at least in the area of the protective shield against external influences. In order to stabilize the canopy, the protective shield preferably has a coupling structure, and the lead component preferably has a mating coupling structure. It is thus possible to couple the coupling structure and the mating coupling structure in releasable fashion when the lead component is brought sufficiently near the protective shield. The protective shield preferably has a shield frame, which bears the coupling structure. A structure made up of a coupling structure and a mating coupling structure may have, for example, a projection, which is insertable into a recess of the respectively other structure and is able to latch within it.

The protective shield may be a front shield situated closer to the front side of the machine or a rear shield situated closer to the rear of the machine, depending on where the lead component is situated in the extended state of the canopy. In this context, an extended state is a state, in which the lead component is situated at a distance from the base section or the base component in the longitudinal machine direction, so that at least a section of the canopy area material spans the operator's platform. It is preferred, however, that the extended state is a maximally extended state or a state having reached an extension length of at least 80%, preferably of at least 90%, of the maximum extension length.

The protective shield is then a specific embodiment of the aforementioned support mechanism. A separate support mechanism may be omitted.

Additionally or alternatively, the earth working machine may comprise a shield running in the transverse machine direction, which, in the event that a protective shield exists, is situated at a distance from the protective shield in the longitudinal machine direction. The shield preferably has a connecting structure and the housing shell preferably has a mating connecting structure. The connecting structure and the mating connecting structure are connected to each other or are connectible in releasable fashion. Since, during the operation of the earth working machine, the housing shell of the base section is not movable or is movable only along a considerably shorter movement path relative to the machine frame in the longitudinal machine direction, the housing shell may be permanently connected to the shield. This normally does not apply to the protective shield and the lead component, since the lead component must normally move away from the protective shield in the longitudinal machine direction when the extension section is retracted into the base section. What was said above regarding the coupling structure and mating coupling structure applies mutatis mutandis to the connecting structure and the mating connecting structure. The mentioned structures may be identically designed and are distinguished merely in language in order to distinguish their belonging on the one hand to the pairing of protective shield-lead component and on the other hand to the pairing shield-housing shell.

At least one shield component of the protective shield and the shield may be designed or arranged so as to be movable relative to the machine frame. The at least one shield component may be collapsable about a collapsing axis preferably running in the transverse machine direction, preferably away from the operator's platform volume so as to prevent interference with the operator's platform. In the same way, the at least one shield component may be movable in translatory fashion in the vertical machine direction relative to the machine frame, for example in order to lower the shield into a storage volume of the machine body and to displace it out of the latter. Mixed forms of translatory and rotary movement of the at least one shield component are also conceivable. The protective shield and the shield may each be movable relative to the machine frame in a different manner, that is, with individual and distinct kinematics. The protective shield is also movable relative to the canopy or to the lead component. The shield may be movable jointly with the housing shell or relative to the latter.

A particular advantage of the presently discussed canopy is the possibility of avoiding collision-prone obstacles, such as branches, advertising or traffic signs, cable links and the like protruding into the movement space of the operator's platform. For, if the canopy is advantageously connected to the machine frame so as to be capable of being raised and lowered relative to the machine frame, the canopy area can be minimized and the "remaining canopy" formed by the base section can be lowered in order to avoid collision when approaching an obstacle. In this state, the earth working machine remains not only completely maneuverable, but also fully operational and can be operated by the machine operator on the operator's platform to its full extent, without risk of a collision of the obstacle with the canopy structure. The base section, for example the housing shell of the base section, may be lowered advantageously into a recess of the machine body, so that with a lowered canopy, no portion of the canopy structure protrudes in the vertical machine direction beyond the rest of the machine body.

In principle, the extension section may be pulled out in the longitudinal machine direction from the front side of the machine to the rear of the machine or in the opposite direction in order to enlarge the canopy area. Preferably, the base section of the canopy is connected to the machine frame at an end section of the operator's platform closer to the rear of the earth working machine, particularly preferably by a lifting device for raising and lowering the base section. The extension direction is then from the rear of the machine toward the front side of the machine. This results in the projection direction of the canopy, still widespread in the hitherto known hard shell canopies, from a canopy support at the rear end area of the operator's platform in the longitudinal machine direction to the front side end area of the operator's platform. Accordingly, the aforementioned shield is preferably a rear window and, if present, the aforementioned protective shield is a front windshield.

In order to protect the machine operator effectively against external influences, such as sunlight and weather conditions, the canopy extends preferably over at least 90% of the width of the operator's platform, on which the machine operator is located during normal operation in order to control the earth working machine. The dimension of the canopy extension in the transverse machine direction, that is, in the direction of the width of the operator's platform, is preferably independent of the extension length of the extension section from the base section, that is, independent of the canopy area set in the longitudinal machine direction.

BRIEF DESCRIPTION OF THE DRAWINGS

The present invention will be explained in greater detail below with reference to the attached drawings. The figures show.

DETAILED DESCRIPTION

Figure 1:
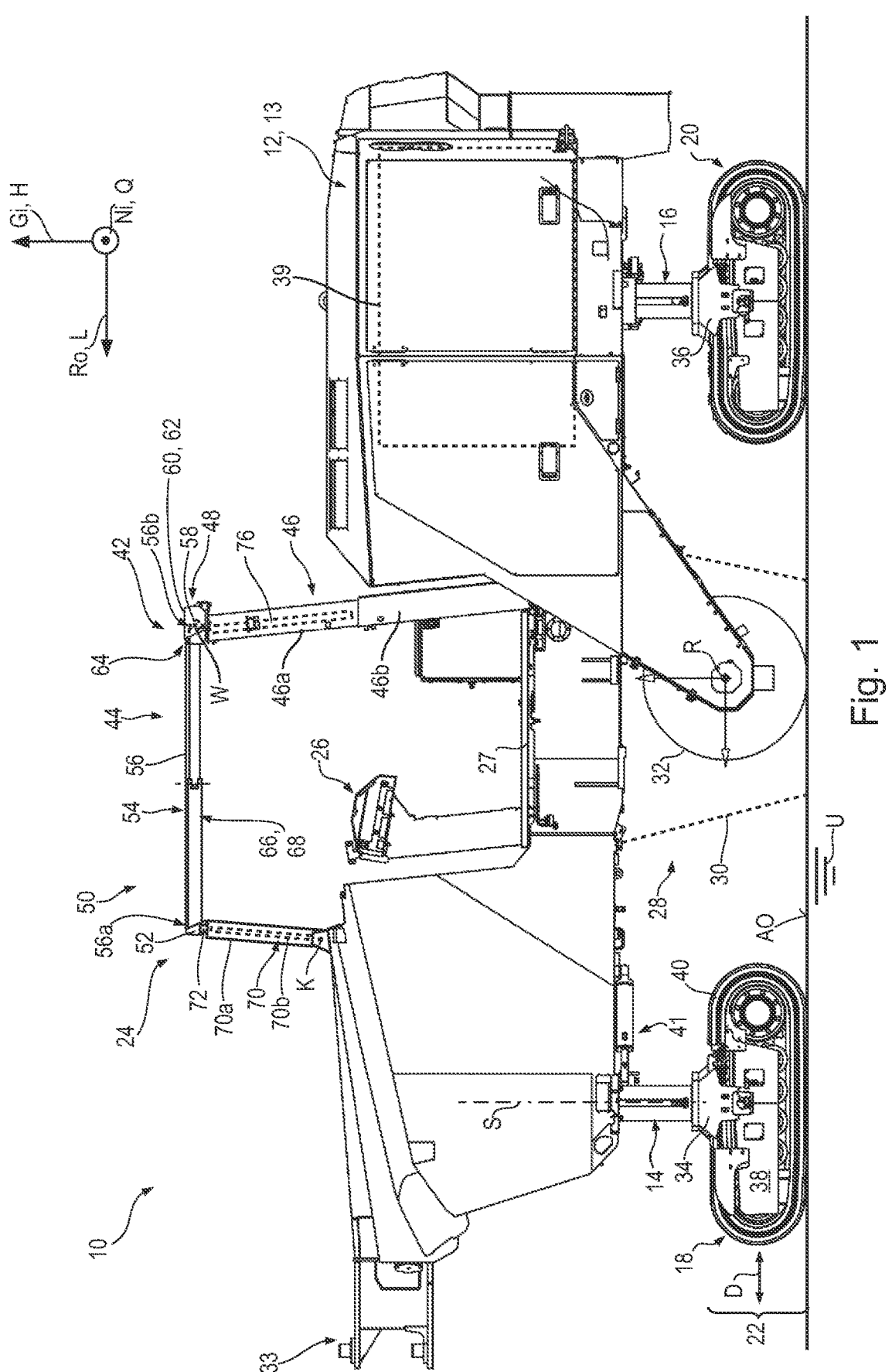
FIG. 1 a rough schematic illustration of a specific embodiment according to the invention of an earth working machine in the form of a large earth or road milling machine including an operator's platform having a fully extended canopy with the maximum canopy area, FIG. 2 a rough schematic illustration of the earth working machine of FIG. 1 having a half-extended canopy with a canopy area reduced compared to FIG. 1, FIG. 3 a rough schematic illustration of the earth working machine of FIGS. 1 and 2 having a retracted canopy with a minimum canopy area, but a raised base section, and FIG. 4 a rough schematic illustration of the earth working machine of FIG. 3 having a retracted canopy and a lowered base section of the canopy.

In FIG. 1, a specific embodiment according to the invention of an earth working machine in the form of a large earth or road milling machine is generally indicated by reference numeral 10. It comprises a machine frame 12, which forms the basic framework for a machine body 13. The machine body 13 comprises the machine frame 12 and components of machine 10, which are connected to the machine frame 12 and which are, if indicated, movable relative thereto.

A Cartesian triad shows the roll axis Ro running in parallel to the drawing plane of FIG. 1 in the longitudinal machine direction L, the yaw axis Gi running orthogonally thereto in the vertical machine direction H and the pitch axis Ni running orthogonally to each of the aforementioned axes Ro and Gi as well as to the drawing plane of FIG. 1. The arrow of the longitudinal machine direction L points in the forward travel direction of the machine 10. The longitudinal machine direction L runs between a front and a rear of the machine frame 12.

The viewer of FIG. 1 is looking onto the earth working machine (or simply "machine") 10 along the pitch axis Ni.

The machine body 13 comprises a pair of front lifting columns 14 and a pair of rear lifting columns 16, each of which is connected at one end to the machine frame 12 so as to be movable in the vertical machine direction H relative to the machine frame 12 and at the other end connected to front drive units 18 and to rear drive units 20. The distance of the machine frame 12 from the drive units 18 and 20 is variable by way of lifting columns 14 and 16. The figures respectively show only the lifting columns 14 and 16 with their respective drive units 18 and 20 on the left side of the machine, which conceal the right lifting columns 14 and 16 situated behind them with their respective drive units 18 and 20.

The drive units 18 and 20 are depicted by way of example as crawler track units. In a departure therefrom, individual, or all, drive units 18 and/or 20 may also be wheel drive units. The drive units 18 and 20 together form a traveling gear 22 of the earth working machine 10.

The earth working machine 10 comprises an operator's platform 24, from which a machine operator is able to control the machine 10 via a control panel 26. The operator's platform 24 furthermore has a floor 27, preferably vibrationally decoupled from the machine frame 12, which forms a standing surface for the machine operator working on the operator's platform 24.

Below the machine frame 12, a working assembly 28 is situated on machine frame 12, here by way of example as a milling assembly 28 including a milling drum 32, which is accommodated in a milling drum housing 30, which is indicated only by dashed lines. The milling drum 32 is rotatable about a milling axis R extending in the transverse machine direction Q so that substrate material may be removed therewith during an earth working operation, starting from the contact surface AO of the substrate U to a milling depth determined by the relative vertical position of the machine frame 12. The milling drum 32 is therefore a working apparatus in the sense of the present application. Alternatively or additionally, the milling drum 32 may be accommodated on the machine frame 12 so as to be vertically adjustable relative to the machine frame 12.

The earth working machine 10 depicted by way of example is a large milling machine, for which the placement of the milling assembly 28 between the front drive units 18 and the rear drive units 20 in longitudinal machine direction L is typical. Large milling machines of this kind, or indeed earth-removing machines in general, may comprise a transport belt so that removed earth material can be transported away from the machine 10. In the interest of better clarity, a transport belt that is also present in principle in the case of machine 10 is not depicted in FIG. 1. However, the supporting device 33 for accommodating a transport belt is shown on the front longitudinal end of the machine frame 12.

Front lifting columns 14 are respectively connected to drive units 18, in a manner also known per se, by a drive unit connecting structure 34, for example a connecting fork fitting around the drive unit 18 in transverse machine direction Q. Rear lifting columns 16 are connected to their respective drive unit 20 via a drive unit connecting structure 36 constructed identically to drive unit connecting structure 34. The drive units 18 and 20 are tiltable relative to their respective supporting drive unit connecting structures 34 and 36 about a tilting axis that is parallel to the ground.

In the illustrated example, drive unit 18, having a forward travel direction (to the left in FIG. 1) and a reverse travel direction (to the right in FIG. 1) indicated by double arrow D, comprises a radially inner accommodation and guidance structure 38 on which a circulating drive track 40 is arranged and is guided for circulating movement. The drive units 18 and 20 are constructed to be substantially identical. Drive units 18 and 20 are motor-driven, normally by a hydraulic motor (not indicated).

In the illustrated exemplary embodiment, the drive power source of machine 10 is, by way of example, an internal combustion engine 39 accommodated on machine frame 12. Additionally or alternatively, the machine 10 may comprise an electric drive power source. In the illustrated exemplary embodiment, the milling drum 32 is rotationally driven by internal combustion engine 39. The power output of the internal combustion engine 39 furthermore provides a hydraulic pressure reservoir on machine 10, which makes it possible to operate hydraulic motors and hydraulic actuators on the machine. The internal combustion engine 39 is thus also the source of the propulsive power of machine 10. Internal combustion engine 39 is consequently a general power source of machine 10.

The lifting columns 14 and with them the drive units 18 are rotatable about a steering axis S by way of a steering apparatus 41. Preferably additionally, but also alternatively, lifting columns 16, and with them their drive units 20, may be rotatable by way of a steering apparatus about a steering axis parallel to steering axis S.

The operator's platform 24 is covered by a protective canopy structure 42, which comprises a protective canopy or hereinafter simply "canopy" 44, which is connected to the machine frame 12 or machine body 13 via a lifting system 46 that can be raised and lowered along the yaw axis Gi. The lifting system 46 is preferably telescopic so that an upper lifting support 46a situated closer to the canopy and connected directly to a base section 48 of the canopy 44 is retractable into and displaceable out of a lower lifting support 46b situated further away from the roof and preferably connected directly to the machine frame 12, for example by a pneumatic, hydraulic or electromechanical lifting actuator (not shown in FIG. 1). In FIG. 1, the protective canopy 44 is shown in its raised operating position with a maximum canopy area. The machine 10 is ready to operate, as in the situations of FIGS. 2, 3 and 4.

Figure 6:
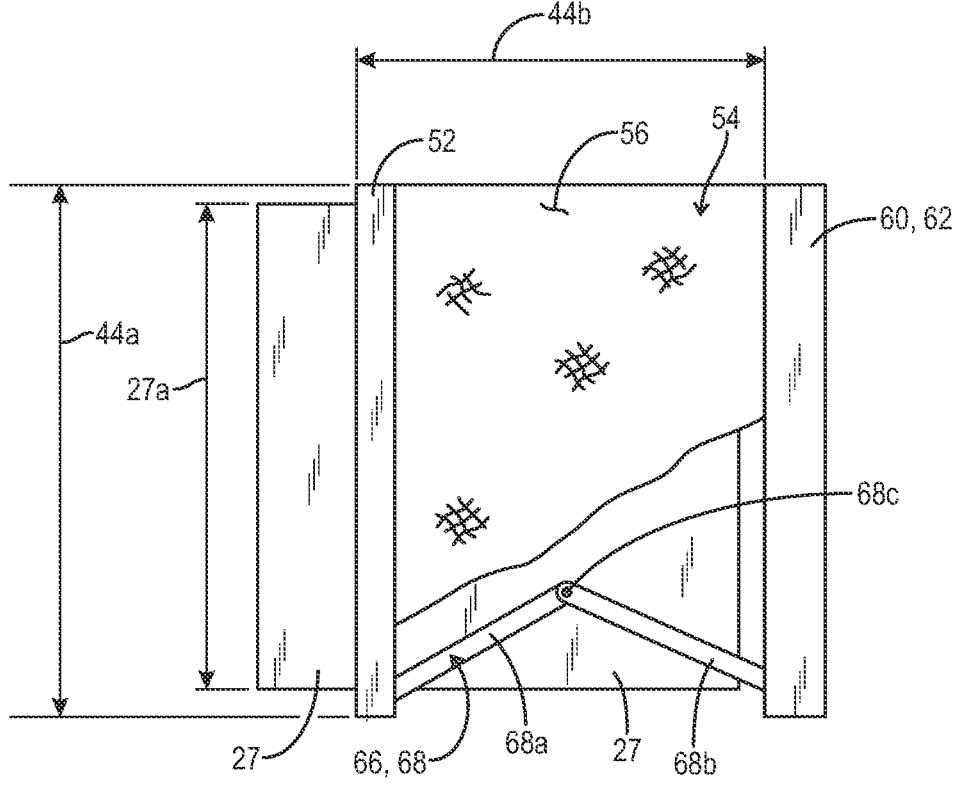
FIG. 6 is a schematic plan view of the operator's platform and of the canopy of FIG. 2 in a half-extended position. The canopy is partially cut away to show details of the canopy support mechanism.

The canopy 44 extends along the pitch axis Ni at least over 90% of the width dimension of the floor 27 along pitch axis Ni, preferably at least over the entire width of the floor or even beyond it on one side or on both sides. This is best seen in the schematic plan view of FIG. 6 where the floor 27 is seen to have a width dimension 27a and the canopy 44 is seen to have a canopy width 44a. In FIG. 6 the canopy width 44a is shown as greater than the floor width 27a and to extend beyond the floor 27 on both sides.

Due to its inclined arrangement, when being raised and lowered by lifting system 46, the canopy 44 also performs a secondary movement component along the roll axis Ro. However, this is considerably smaller in extent than the primary raising and lowering component along yaw axis Gi.

In addition to the base section 48, the canopy 44 comprises an extension section 50 extendable from and retractable into the base section 48 in the longitudinal machine direction L. The extension section 50 comprises a lead component 52, in the illustrated exemplary embodiment a rigid bar extending over the entire canopy width in the transverse machine direction Q.

In the exemplary embodiment, a canopy area 54 is formed by a flexible material web 56, for example a woven, preferably water-proofed textile or sheeting, including fiber-reinforced sheeting, which is fixed on the lead component 52 by a lead section 56a and which is fixed by a fixation section 56b on a winding roll core 58 in the base section 48. The flexible material web 56 forms a canopy area component variable in length in the longitudinal machine direction. As seen in FIG. 6 the canopy area 54 is determined by the canopy width 44a and the extension length 44b of the canopy 44. The extension length 44b is variable.

With their primary movement along the roll axis Ro, the lead component 52 and with it the canopy area 54 may also have a secondary movement component, of lesser extent, in another spatial direction, in particular along the yaw axis Gi.

The winding roll core 58 rotatable about the winding axis W, which is orthogonal to the drawing plane of FIG. 1, may be pretensioned in the winding direction of the flexible material web 56 forming the canopy area 54, so that the canopy area 54 formed by the flexible material web is always taut.

The base section 58 has a housing shell 62 as a base component 60, in which the winding roll core 58 is mounted so as to be rotatable about the winding axis W. The housing shell 62 has an extension slit 64, which has its greatest dimension by far in the transverse machine direction Q and is in the circumferential direction about the winding axis W only somewhat larger than the thickness of the material web 56, for example somewhat larger than the change of the winding radius on the winding roll core 58 between the completely extended and completely retracted operating positions. Through this extension slit 64, the material web 56 forming the canopy area 54 exits and enters the housing shell 62. A wiping device, for example a lip and/or a brush, may be provided on the extension slit 64 in order to prevent the ingress of foreign material into the housing shell 62 through the retraction movement of the material web 56.

The lead component 52 is connected to the base section 58 or the base component 60 by a guide structure 66, an articulated arm system 68 in the illustrated example. Instead of the articulated arm system 68, a scissor system or a telescope system is also conceivable. The articulated arm system 68 may be pretensioned into its extended position in order to keep the flexible material web 56 taut and in order to facilitate an extension from a completely collapsed position. The articulated arm system 68 is further shown in the plan view of FIG. 6. There it is seen that each articulated arm system 68 includes a forward arm 68a and a rear arm 68b joined at pivot 68c. An internal spring biases the articulated arm 68 towards an extended position in opposition to a tension force in the material web 56 of the awning 44. Two or more such articulated arm systems 68 may extend between the housing shell 62 and the lead component 52.

Figure 2:
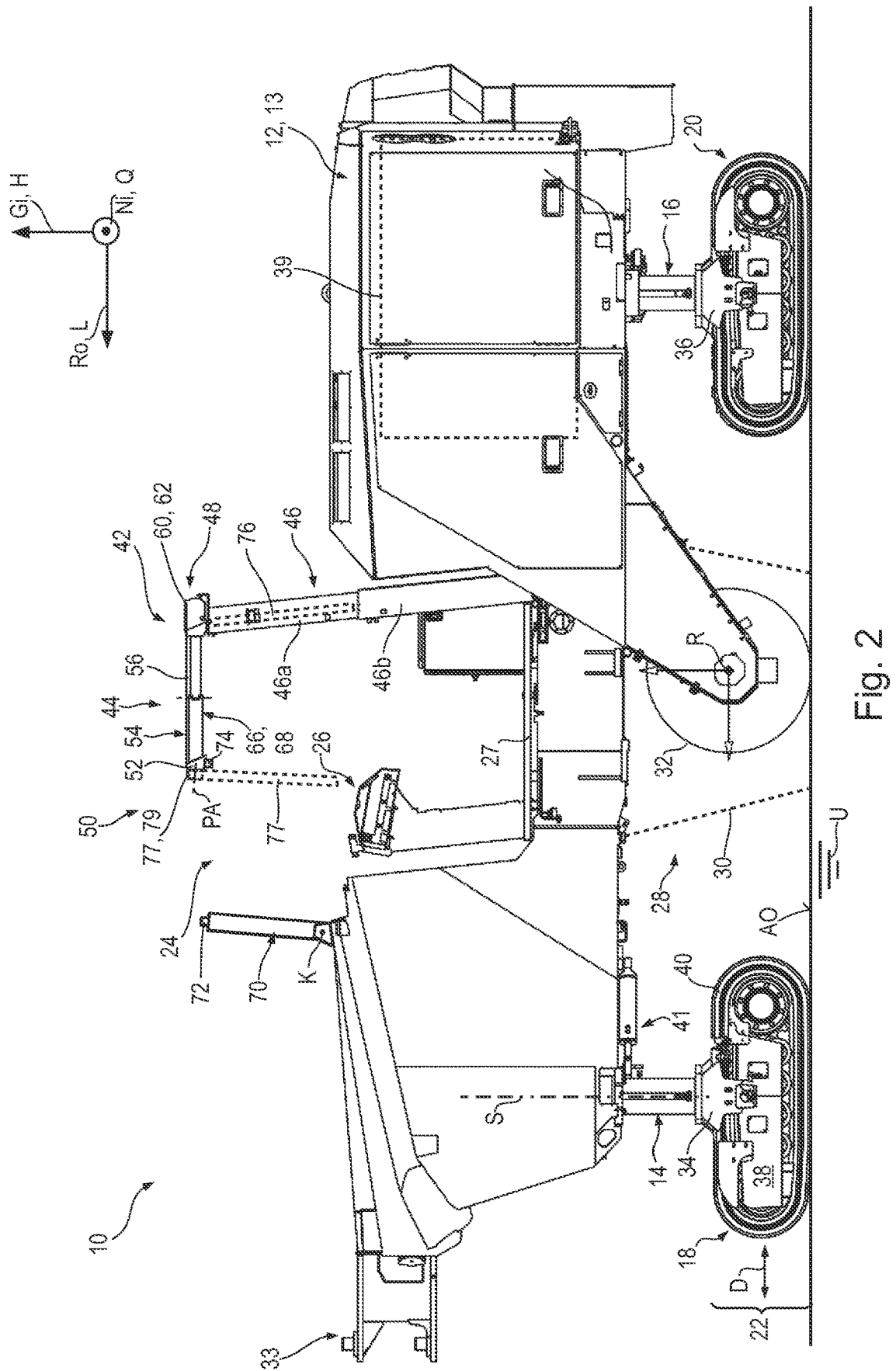
Figure 3:
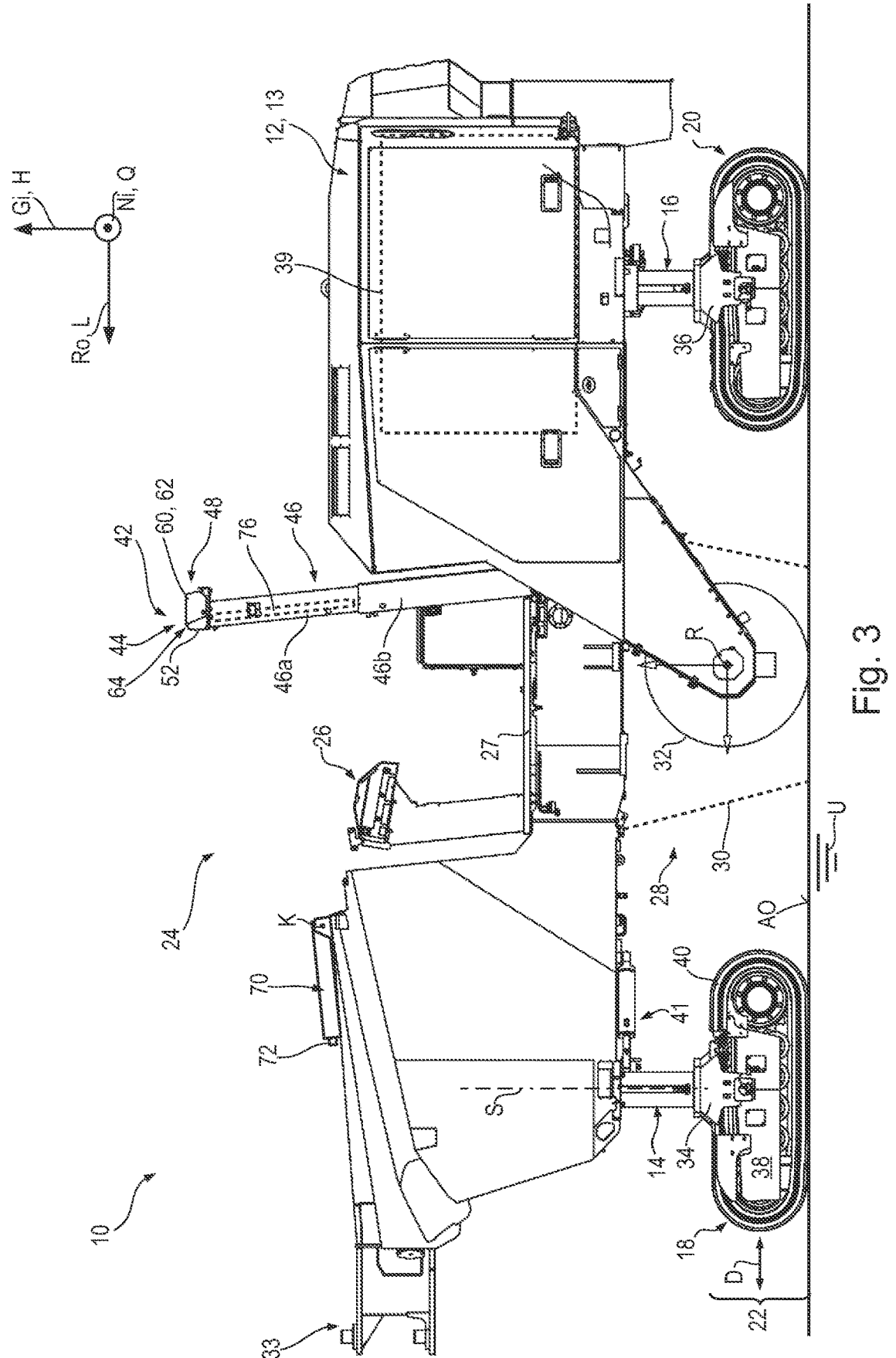
Figure 4:
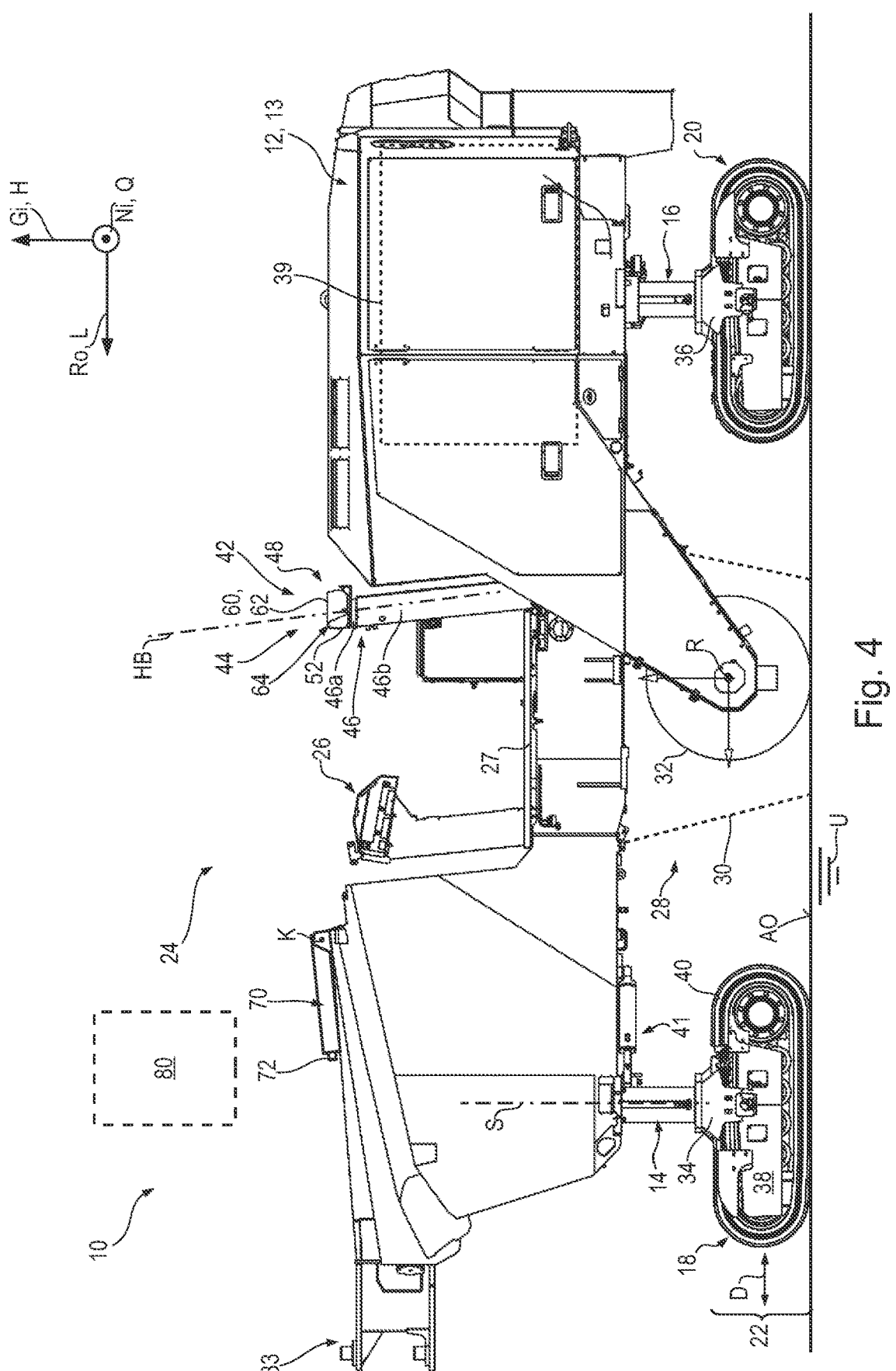

The machine 10 or the operator's platform 24 has a front windshield 70, which is collapsable about a collapsing axis K running in the transverse machine direction Q from the raised position shown in FIGS. 1 and 2 forward into the collapsed position shown in FIGS. 3 and 4. A coupling structure 72 permanently connected to the windshield 70 is coupleable in releasable fashion to a mating coupling structure 74 on the lead component 52 shown in FIG. 2. By coupling the windshield 70 to the lead component 52, it is possible to stabilize the canopy 44, which would otherwise cantilever on one side from the base section 58.

The windshield 70 normally comprises a shield frame 70a and a shield panel 70b retained by it (shown only in FIG. 1 by a dashed line).

In the end area of the operator's platform 24 situated closer to the rear of the vehicle, a rear window 76 shown in FIG. 1 only by a dashed line is rigidly connected to the base component 60 for joint movement along the translatory lift path HB (see FIG. 4.) The rear window 76 may be connected, additionally or alternatively, to the upper lifting support 46a or to a pair of lifting supports 46a situated at a distance from each other in the transverse machine direction Q. In the preferred case of a pair of upper lifting supports 46a, the rear window 76 is preferably situated between the two upper lifting supports 46a in the transverse machine direction.

FIG. 2 shows the canopy 44 with a canopy area 54 reduced in comparison to the operating position of FIG. 1.

The winding roll core 58, which is shown only in FIG. 1 for better clarity, may be driven to rotate manually or by a motor, for example an electric motor. A motor shaft may run coaxially to the winding axis W or crosswise, in particular orthogonally, with respect to it, in which case a gear is interposed between the drive, be it a manual drive or a motor drive, and the winding roll core 58. Such a gear is preferably a worm gear, which is on the one hand self-locking, so that a drive torque needs to be applied only for the duration of the change of the size of the canopy area 54, and which on the other hand is able to produce very great output torques at relatively low input torques. In the case of an electric drive, the gear between the winding roll core 58 and the motor may be a planetary gear. For securing the respective position of the lead component 52 or the canopy area 54, an electrically releasable brake may be provided in the drive train.

The self-locking mechanism of such a gear, in particular of a worm gear, facilitates the construction of the canopy 44 having a canopy area 54 of variable length in the longitudinal machine direction L considerably in that for example the pretensioning of the winding roll core 58 in the winding direction may be omitted.

Figure 7:
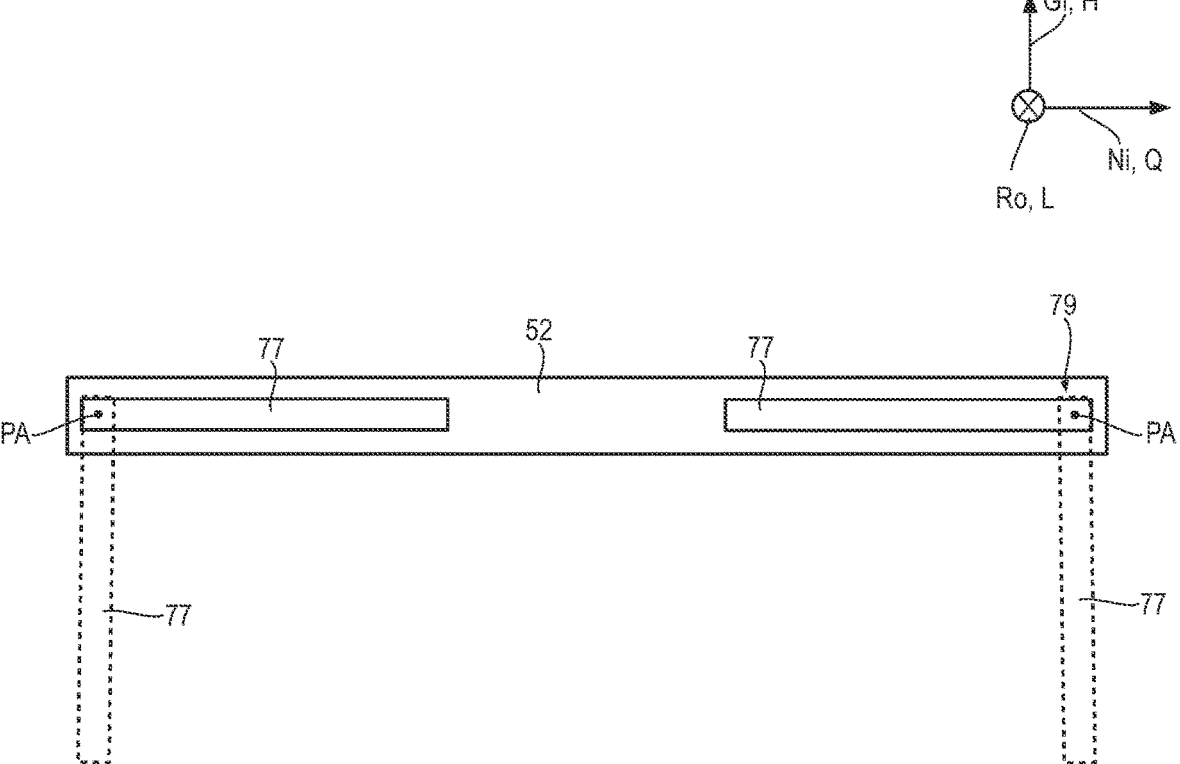
FIG. 7 is a schematic front elevation view of the lead component of the canopy and two support braces that can support the lead component from the machine frame.

FIG. 2 additionally shows by a dotted line a support brace 77 as part of an alternative or additionally present support mechanism 79, which swivels about a swivel axis PA between an inactive position, in which the support brace runs along the lead component 52 in the transverse machine direction Q and an active position, in which it is swiveled down. The support brace 77 is shown in the active position by a dotted line. The support brace 77 may be variable in length, for example telescopic, so that the lead component 52 and with it the canopy area 54 are supportable on the machine body 13 even when the lead component 52 or the canopy area 54 are not extended all the way to the windshield 70. FIG. 7 shows a schematic front elevation view of the lead component with such a support brace 77 adjacent each end, again with the support braces 77 shown in stored position in solid lines and in an active position in dotted lines. The support braces 77 may also be referred to as a support mechanism 77 configured to support the lead component 52 directly or indirectly from the machine frame 12.

FIG. 3 shows a fully retracted position of the canopy 44, in which the entire material web 56 together with the collapsed articulated arm system 68 are accommodated in the housing shell 62 of the base section 58 and in which the lead component 52 closes the extension slit 64 of the housing shell 62. The windshield 70 is now collapsed forward.

The adjoining components: lead component 52 and base component 60 or housing shell 62, each of which may have a multi-part design, form a "remaining canopy" 44 in FIG. 3, essentially without canopy area.

FIG. 4 shows machine 10 with a lowered protective canopy structure 42 or with a lowered remaining canopy 44. In this way, the machine 10 is able to drive, for example, underneath an obstacle 80, for example a branch, a traffic sign, a cable link and the like, without risk of a collision between a portion of the operator's platform 24, in particular of the protective canopy structure 42, and the obstacle 80. At the same time, the machine operator on the operator's platform 24 is able to move freely on the operator's platform 24 in spite of the lowered protective canopy structure 42. When driving underneath the obstacle 80, the machine 10 thus remains not only maneuverable, but fully operational. Only the machine operator himself must evade the obstacle, if necessary, which he is readily able to do.

Figure 5:
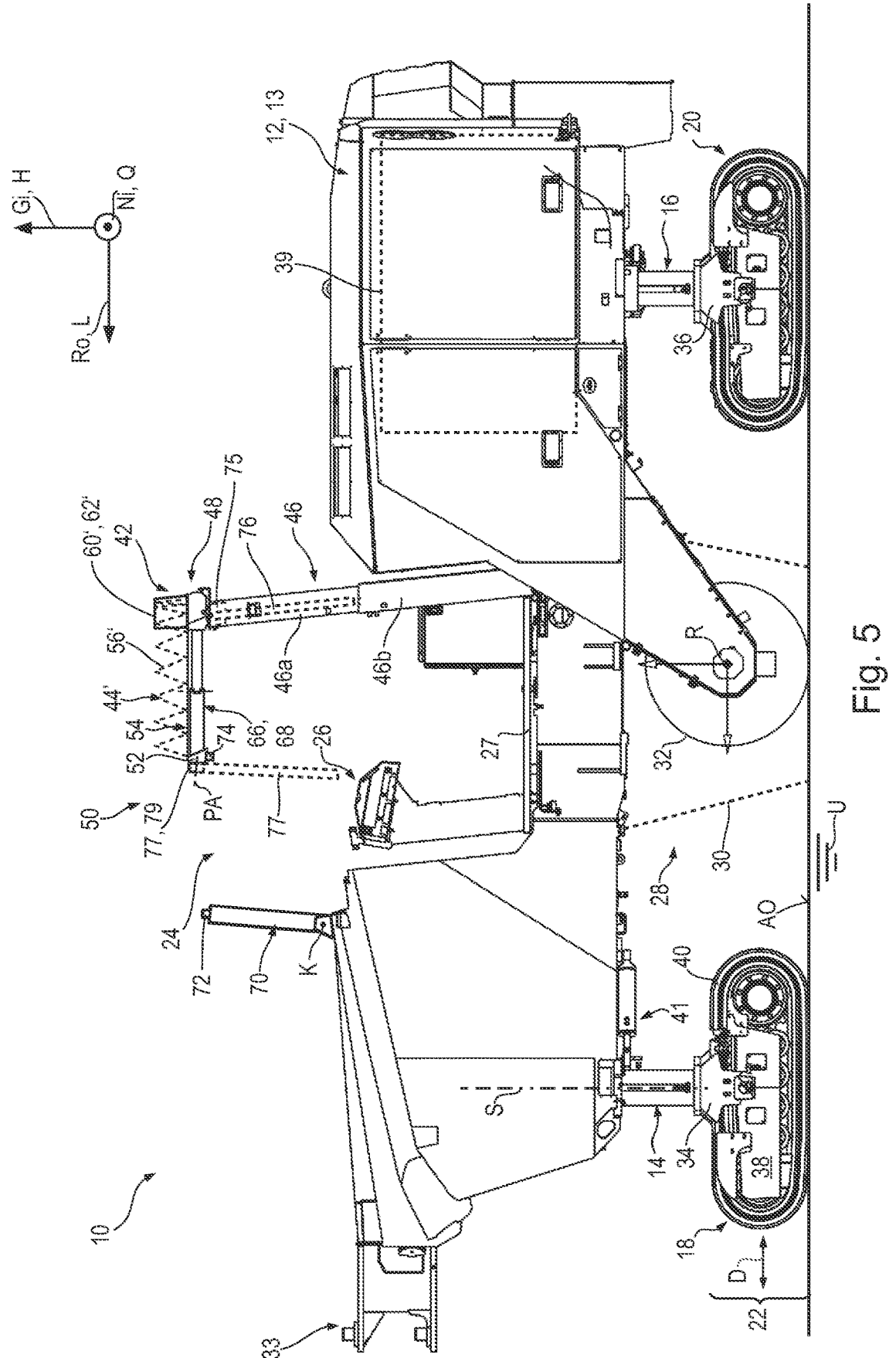
FIG. 5 is a view similar to FIG. 2 of an alternative embodiment of a foldable canopy in a half-extended position.

FIG. 5 shows a view similar to FIG. 2 of an alternative embodiment of the awning 44 in a half-extended position. In FIG. 5 the canopy 44' has a foldable canopy area material web 56' that is retractable into a housing shell 62' of base component 60'.

The invention claimed is:

1. A self-propelled earth working machine comprising:
   a machine frame defining a longitudinal machine direction between a front and a rear of the machine frame;
   a plurality of tracks or wheels supporting the machine frame;
   a working apparatus supported from the machine frame for earth working;

a power source supported from the machine frame for providing power to the working apparatus;
an operator's platform; and
a canopy configured to at least partially cover the operator's platform, the canopy having a variable canopy area variable in the longitudinal machine direction;
wherein the canopy includes a base section and an extension section, the extension section being extendable and retractable relative to the base section in the longitudinal machine direction, and the variable canopy area being variable as a function of an extension length by which the extension section is extended from the base section;
wherein the extension section includes a flexible canopy area material for forming at least a portion of the variable canopy area;
wherein the extension section includes a lead component distinct from the flexible canopy area material, the lead component being movable away from and toward the base section in the longitudinal machine direction, the flexible canopy area material being disposed between the lead component and the base section; and
wherein the canopy further includes a guide structure extending between the base section and the lead component and configured to guide extension and retraction of the lead component relative to the base section, the guide structure being configured to hold the canopy in a cantilevered position relative to the base section when the lead component is extended from a fully retracted position toward a fully extended position.

2. The self-propelled earth working machine as recited in claim 1, wherein:
   the flexible canopy area material is a windable and/or foldable canopy area material.

3. The self-propelled earth working machine as recited in claim 1, wherein:
   a lead section of the flexible canopy area material, which precedes a further section of the flexible canopy area material when the extension section is pulled out in order to enlarge the variable canopy area, is fixed on the lead component for joint movement with the lead component.

4. The self-propelled earth working machine as recited in claim 1, further comprising:
   a support mechanism configured to support the lead component directly or indirectly from the machine frame when the lead component is in the fully extended position.

5. The self-propelled earth working machine as recited in claim 1, further comprising:
   a protective shield running in a transverse machine direction transverse to the longitudinal machine direction, the protective shield including a coupling structure; and
   wherein the lead component includes a mating coupling structure, the coupling structure and the mating coupling structure being releasably coupleable to each other when the lead component is brought sufficiently near the protective shield.

6. The self-propelled earth working machine as recited in claim 1, wherein:
   the base section includes a base component on which a fixation section of the flexible canopy area material is fixed.

7. The self-propelled earth working machine as recited in claim 6, wherein:
   the base component includes a winding roll core is rotatable about a winding axis.

8. The self-propelled earth working machine as recited in claim 1, wherein:

the base section includes a housing shell at least partially surrounding the extension section in a retracted state of the extension section.

9. The self-propelled earth working machine as recited in claim 8, further comprising:

a shield running in a transverse machine direction transverse to the longitudinal machine direction, the shield being connected to the housing shell.

10. The self-propelled earth working machine as recited in claim 9, wherein:

the shield is movable relative to the machine frame.

11. The self-propelled earth working machine as recited in claim 1, wherein:

the canopy is connected to the machine frame so as to be liftable and lowerable relative to the machine frame.

12. The self-propelled earth working machine as recited in claim 1, wherein:

the base section of the canopy is connected to the machine frame on an end section of the operator's platform closer to the rear than to the front of the machine frame.

13. The self-propelled earth working machine as recited in claim 1, wherein:

the canopy extends over at least 90% of a width of a floor of the operator's platform on which the machine operator is located during normal operation in order to control the earth working machine.

14. The self-propelled earth working machine as recited in claim 1, wherein:

the guide structure includes an articulated arm system.

15. The self-propelled earth working machine as recited in claim 1, wherein:

the guide structure includes an articulated arm system, a scissor system or a telescope system.

* * * * *